United States Patent [19]

Hass et al.

[11] 4,444,741

[45] Apr. 24, 1984

[54] CATALYST AND PROCESS FOR OXIDIZING HYDROGEN SULFIDE

[76] Inventors: Robert H. Hass, Fullerton; John W. Ward, Yorba Linda, both of Calif.

[21] Appl. No.: 336,011

[22] Filed: Dec. 30, 1981

Related U.S. Application Data

[60] Division of Ser. No. 191,864, Sep. 29, 1980, and a continuation-in-part of Ser. No. 27,033, Apr. 4, 1979.

[51] Int. Cl.$^3$ .................... C01B 23/14; C01B 17/52; B01J 23/14; B01J 29/16
[52] U.S. Cl. ................................. 423/542; 423/230; 423/535; 423/539; 423/573 G; 502/247; 502/249; 502/517
[58] Field of Search .............. 423/224, 230, 522, 535, 423/539, 542, 573 G, 574 R

[56] References Cited

U.S. PATENT DOCUMENTS

| 349,981 | 9/1886 | Claus | 423/573 |
|---|---|---|---|
| 1,695,285 | 12/1928 | Jaeger et al. | 423/535 |
| 1,895,724 | 1/1933 | Miller et al. | 423/224 |
| 1,900,751 | 3/1933 | Baehr | 423/224 |
| 2,083,894 | 6/1937 | Connolly | 423/573 |
| 2,083,895 | 6/1937 | Connolly | 423/473 |
| 2,697,064 | 12/1954 | Brown | 423/576 |
| 2,836,481 | 5/1958 | Hofstede | 423/573 G |
| 2,889,207 | 6/1959 | Eliot | 423/574 |
| 2,958,586 | 11/1960 | Barber | 423/576 |
| 3,232,978 | 2/1966 | Yasuhara et al. | 252/456 |
| 3,438,721 | 4/1969 | Innes | 423/576 |
| 3,488,402 | 1/1970 | Michaels et al. | 252/464 |
| 3,492,248 | 1/1970 | Notari et al. | 252/456 |
| 3,702,886 | 11/1972 | Argauer et al. | 423/328 |
| 3,709,979 | 1/1973 | Chu | 423/328 |
| 3,752,877 | 8/1973 | Beavon | 423/244 |
| 3,798,315 | 3/1974 | Nicklin | 423/574 |
| 3,848,071 | 11/1974 | Groenendaal | 423/574 |
| 3,997,655 | 12/1976 | Reh et al. | 423/533 |
| 4,012,486 | 3/1977 | Singleton | 423/224 |
| 4,019,880 | 4/1977 | Rabo et al. | 55/68 |
| 4,048,293 | 9/1977 | Renault et al. | 423/574 L |
| 4,061,724 | 12/1977 | Grose et al. | 423/335 |

FOREIGN PATENT DOCUMENTS

| 522199 | 10/1955 | Belgium | 423/535 |
|---|---|---|---|
| 1070681 | 2/1953 | France | 423/574 |
| 78096 | 5/1955 | Netherlands . | |
| 13844 | of 1897 | United Kingdom . | |
| 319396 | 9/1929 | United Kingdom | 423/574 |
| 341725 | 1/1931 | United Kingdom . | |
| 600118 | 3/1948 | United Kingdom | 423/573 G |
| 733004 | 7/1955 | United Kingdom | 423/230 |
| 749645 | 5/1956 | United Kingdom . | |

OTHER PUBLICATIONS

"Bulletin Z-50," Norton Process Products Division, Akron, Ohio, 1970.
"Catalyst for the Oxidation of Benzene to Maleic Anhydride" by Di Cio et al. in *Chemical Abstracts*, vol. 75, No. 37065z, (1971).
"Dibenzofuran" by Moggi et al. in *Chemical Abstracts*, vol. 85, No. 108512n, (1976).
"Acetic Acid by Catalytic Oxidation of Butenes" by Yamashita et al. in *Chemical Abstracts*, vol. 72, No. 42815m, (1970).
"Mixed Catalysts with High Structural Resistance" by Brockhaus in *Chemical Abstracts*, vol. 65, No. 4713d.
"Activity of Molybdenum Oxide-Bismuth Oxide Catalysts and the Influence of Metallic Oxide Mixtures" by Popescu et al. in *Chemical Abstracts*, vol. 74, No. 25421d, (1971).
Kirk-Othmer *Encyclopedia of Chemical Technology*, 2nd Ed., vol. 19, pp. 467-469.
Beavon et al., "BSR/Selectox I Sulfur Recovery Process for Claus Tail Gas Treating" Presented at 5th Canadian Symposium on Catalysis, Oct. 26-27, 1977 in Calgary, Alberta, Canada.
Flanigan et al. "Silicalite, a New Hydrophobic Crystalline Silica Molecular Sieve" published in *Nature*, vol. 27, No. 5645, (Feb. 1978).
"Acrylonitrile by Catalytic Propene Ammoxidation" by Ghirga et al. in *Chemical Abstracts*, vol. 81, No. 38074n (1974).
"Catalytic Manufacture of Acrylonitrile" by Umemura et al. in *Chemical Abstracts*, vol. 88, No. 51341m, (1978).
"Acrylic Acid by Catalytic Oxidation of Propene" by Hensel et al. in *Chemical Abstracts*, vol. 78, No. 71464a, (1973).
"Catalytic Production of Isoprene" by Watanabe et al. in *Chemical Abstracts*, vol. 74, No. 127156p.
"Manufacture of Benzonitrile" by Mamedalieu et al. in *Chemical Abstracts*, vol. 89, No. 42848a, (1978).
"Isoprene" by Watanabe et al. in *Chemical Abstracts*, vol. 75, No. 37602x, (1971).

*Primary Examiner*—Gary P. Straub

[57] ABSTRACT

Catalysts comprising bismuth and vanadium components are highly active and stable, especially in the presence of water vapor, for oxidizing hydrogen sulfide to sulfur or SO$_2$. Such catalysts have been found to be especially active for the conversion of hydrogen sulfide to sulfur by reaction with oxygen or SO$_2$.

42 Claims, No Drawings

CATALYST AND PROCESS FOR OXIDIZING HYDROGEN SULFIDE

CROSS-REFERENCE TO RELATED APPLICATIONS

This application is a division of application Ser. No. 191,864 filed on Sept. 29, 1980, which application Ser. No. 191,864 is a continuation-in-part of co-pending application, Ser. No. 27,033 filed Apr. 4, 1979, with the present application also being a continuation-in-part of co-pending application Ser. No. 27,033 filed Apr. 4, 1979.

BACKGROUND OF THE INVENTION

This invention relates to a process for oxidizing $H_2S$, and particularly to a process for catalytically oxidizing $H_2S$ to sulfur, $SO_2$, or both in the presence of a substantial proportion of water vapor.

Current air pollution regulations are very restrictive concerning the amount of $H_2S$ that may be discharged to the atmosphere. In some instances, gas streams may not be discharged to the atmosphere if they contain more than about 10 ppmv of $H_2S$. Thus, many processes have been developed to remove $H_2S$ from gas streams prior to their discharge to the atmosphere.

One method known in the art for removing $H_2S$ involves catalytic oxidation, that is, a gas stream containing $H_2S$ is blended with air or free oxygen, and the resulting mixture is then passed through a bed of catalyst particles under appropriate conditions such that the $H_2S$ is converted to elemental sulfur vapor or $SO_2$, or both, as desired. One catalyst useful for the gas phase conversion of $H_2S$ to sulfur or $SO_2$ is disclosed in U.S. Pat. No. 4,092,404; it comprises one or more vanadium oxides or sulfides supported on a refractory oxide such as alumina or silica-alumina. Another such catalyst is disclosed in U.S. Pat. No. 4,012,486, wherein a catalyst having active components consisting of bismuth is used to catalytically incinerate $H_2S$ to $SO_2$.

When compared, the bismuth catalyst of U.S. Pat. No. 4,012,486 will generally be found to be less active than the vanadia catalyst of U.S. Pat. No. 4,092,404 for oxidizing $H_2S$ to $SO_2$. On the other hand, a bismuth catalyst is much more stable than a vanadia catalyst at operating temperatures below about 600° F. when $H_2S$ must be removed from a gas stream, such as an off-gas derived from a geothermal power plant, which contains water vapor at a water vapor partial pressure above 1.0 psia, usually at least 4.0 psia. In general, vanadia catalysts have satisfactory stability in the presence of water vapor at partial pressures below about 1.0 psia or at operating temperatures above about 600° F., but under the combined conditions of temperature below 600° F. and water vapor partial pressures above about 1.0 psia, and particularly at 1.5 psia or above, vanadia catalysts deactivate rapidly. It is believed that the reason for this deactivation is due to a complex series of chemical reactions involving the conversion of the vanadium oxide or sulfide active catalytic components to less active forms of vanadium, such as vanadyl sulfate ($VOSO_4$).

As stated above, vanadia catalysts are highly active for the oxidation of $H_2S$ and, as disclosed in U.S. Patent application Ser. No. 700,513, filed June 28, 1976, now U.S. Pat. No. 4,243,647, such catalysts have proven most useful for oxidizing $H_2S$ to sulfur by reaction with either oxygen or $SO_2$. In the presence of less than about 1.0 psia water vapor, vanadia catalysts have proven to be remarkably stable, providing high conversions of $H_2S$ to sulfur for a time period of more than 1 year with little if any deactivation being noticed. Despite the remarkable properties of vanadia catalysts, however, it is an object of the present invention not only to improve the stability of vanadium-containing catalysts in the presence of water vapor but to substantially improve their activity for converting $H_2S$ to sulfur. More specifically with respect to water vapor, it is an object of the invention to provide a process for catalytically oxidizing $H_2S$ in the presence of water vapor at a partial pressure of more than about 1.0 psia, particularly above about 1.5 psia, and more particularly still, above about 2.0 psia. It is yet another object of the invention to achieve the foregoing without oxidizing such component as $H_2$, $CO$, $NH_3$, and $CH_4$ that might be present during the oxidation of the $H_2S$. Other objects and advantages will become apparent from the following description of the invention.

SUMMARY OF THE INVENTION

It has now been found that catalysts comprising bismuth and vanadium components are highly active and stable for the gas phase oxidation of hydrogen sulfide, especially in the presence of water vapor. Such catalysts combine the high activity of vanadia catalysts with the stability of bismuth catalysts. In addition, it has been found that the catalyst of the invention is usually substantially more stable in the presence of water vapor than catalysts comprising bismuth or vanadium alone, especially at operating temperatures below about 600° F.

The catalyst of the invention is useful when $H_2S$ must be oxidized in the gas phase in the presence of water vapor at a partial pressure of more than about 1.0 psia. Because $H_2S$ produces an equivalent volume of water vapor for each volume of $H_2S$ converted to sulfur or $SO_2$, it will be understood that the invention is useful in a process wherein the water vapor partial pressure in the feed gas is less than about 1.0 psia initially but, during contact with the catalyst, increases above 1.0 psia.

An advantage in the invention resides in the highly selective nature of the catalyst. Components selected from the group consisting of $H_2$, $CO$, $NH_3$, and those saturated hydrocarbon gases containing no more than 6 carbon atoms (i.e., light hydrocarbons) are not oxidized in the process of the invention. Additionally, the oxidation of $H_2S$, if performed at a temperature less than about 900° F., produces essentially no $SO_3$.

In addition to the foregoing, and perhaps most remarkable of all, vanadium-bismuth catalysts have been found to provide higher activity than comparable vanadia catalysts for the conversion of $H_2S$ to sulfur. This discovery came as a distinct surprise, for vanadia catalysts are themselves highly active for the conversion of $H_2S$ to sulfur. But comparable vanadium-bismuth catalysts prove not only to be more active than vanadia catalysts but substantially more so. For example, as will be shown hereinafter in Example VI, where prior art vanadia catalysts consisting essentially of about 10 wt. % vanadium pentoxide on silica-alumina are known to be active for lighting off the reaction between $H_2S$ and oxygen to produce sulfur at a temperature of about 375° F., vanadium-bismuth catalysts having the same support but comprising 8.7 wt. % vanadium components and 12.9 wt. % bismuth components prove active for lighting off the conversion of H$_2$S to sulfur at temperatures below 300° F.

All references herein to catalysts containing vanadium and bismuth or to catalysts containing vanadium and bismuth components include within their meaning catalysts active for oxidizing H$_2$S containing (1) elemental vanadium and elemental bismuth, (2) elemental vanadium and one or more bismuth compounds, (3) elemental bismuth and one or more vanadium compounds, (4) one or more vanadium compounds and one or more bismuth compounds, (5) one or more compounds of bismuth and vanadium (e.g., a bismuth vanadate), or (6) a combination of any of the foregoing.

DETAILED DESCRIPTION OF THE INVENTION

Active catalysts for use in the invention comprise vanadium and bismuth as the essential active components. The essential active components may be present as the elements V and Bi, or as a mixture of individual vanadium and bismuth compounds (for example, Bi$_2$S$_3$ admixed with V$_2$S$_5$), or as a compound of both bismuth and vanadium, such as Bi(VO$_3$)$_3$ or BiVO$_4$. Alternatively, the catalyst may contain any combination of elements and compounds of vanadium and bismuth as the essential active components. Preferred catalysts contain at least one vanadium oxide or sulfide (e.g., V$_2$O$_5$, V$_2$O$_3$, V$_2$S$_5$, and V$_2$S$_3$) and at least one bismuth oxide or sulfide (e.g., BiO, Bi$_2$O$_3$, Bi$_2$O$_5$, BiS, Bi$_2$S$_3$, and Bi$_2$O$_4$). The most highly preferred catalyst contains at least some bismuth vanadate (i.e., as the orthovanadate, BiVO$_4$ or Bi$_2$O$_3$.V$_2$O$_5$, metavanadate, Bi(VO$_3$)$_3$, or pyrovanadate Bi$_4$(V$_2$O$_7$)$_3$).

The typical catalyst contains vanadium and bismuth components in an intimate mixture, and although the catalyst may consist essentially of such a mixture, it is highly preferred that the vanadium and bismuth components be composited, as by impregnation or comulling, with a carrier material. The carrier (or support) material usually comprises a porous refractory oxide, including, for example, such preferred refractory oxides as alumina, silica, zirconia, titania, magnesia, silica-alumina, silica-zirconia, silica-titania, silica-magnesia, silica-zirconia-titania, and combinations thereof. Suitable refractory oxides include acidic metal phosphates and arsenates, such as aluminum phosphate, boron phosphate, aluminum arsenate, chromium phosphate, etc. Other suitable supports include the hydrophobic, crystalline silicas, such as the silicalites taught in U.S. Pat. No. 4,061,724. (As used herein, a refractory oxide is hydrophobic if it is capable of absorbing no more than about 0.5 cc/gm of water). Also suitable are the amorphous and crystalline aluminosilicate zeolites, whether naturally-occurring or synthetically made. The most useful crystalline aluminosilicate zeolites are ion-exchanged so as to remove essentially all ion-exchangeable alkali or alkaline earth components. Of particular usefulness are the crystalline aluminosilicate zeolites which are hydrophobic and essentially free of alkali and alkaline earth components. Illustrative of such zeolites are the ZSM-5 zeolite disclosed in U.S. Pat. No. 3,702,886, the ZSM-11 zeolite disclosed in U.S. Pat. No. 3,709,979, and the several hydrophobic zeolites disclosed in U.S. Pat. No. 4,019,880. Such zeolites are characterized by high ratios of silica-to-alumina.

The most highly preferred refractory oxide carrier is silica-alumina when the alumina is present in a proportion of at least 10 weight percent, preferably between about 20 and 30 weight percent. Catalysts prepared from such supports are usually more active for oxidizing H$_2$S than are catalysts prepared from most other refractory oxides. In addition, such supports are highly resistant to sulfation, that is, in the presence of SO$_3$ and/or SO$_2$ plus O$_2$, such supports are resistant to the formation of aluminum sulfate and the consequent loss of surface area, crushing strength, and activity. In general, it can be expected that catalysts prepared from silica-alumina supports containing at least 10 weight percent alumina will experience little if any deactivation due to sulfation under the conditions of the process hereinafter described.

There are several methods known in the art by which the vanadium and bismuth components may be composited with a refractory oxide support. One such method involves impregnation, that is, a suitable support, such as pellets or extrudates of 75% SiO$_2$-25% Al$_2$O$_3$ silica-alumina, is contacted with a solution of ammonium vanadate (or other soluble vanadium compound), dried at an elevated temperature (usually about 230° F.), and then contacted with a solution of a bismuth salt, such as an acidic solution of a bismuth nitrate or chloride. The composite may also be prepared by any of a variety of comulling techniques. A typical procedure involves mulling silica-alumina with solid ammonium metavanadate, solid bismuth nitrate, and sufficient water to create a paste suitable for extrusion through a die. More preferably, either or both of the vanadium and bismuth salts may be added to the mulling mixture in solution form. In a preferred embodiment, a mixture of silica-alumina, a solution of bismuth nitrate in dilute nitric acid, and an aqueous solution of ammonium metavanadate are comulled. Alternatively, a silica-alumina or other refractory oxide is comulled, for example, with an ammonium metavanadate solution, then dried or calcined at an elevated temperature, and then comulled with an aqueous solution of a bismuth salt, such as a solution of bismuth nitrate in dilute nitric acid. Comulling may also be accomplished by mixing silica-alumina with one or more bismuth vanadates in the presence of water. Alternatively still, the composite may be prepared by a combination of impregnation and comulling techniques, as by impregnating silica-alumina with ammonium vanadate, calcining, and then comulling with an acidic solution of bismuth nitrate or chloride.

After a composite is prepared by one of the foregoing impregnation and/or comulling methods or their equivalents, the composite is calcined, usually at a temperature between about 700° and about 1600° F., preferably 900°–1200° F. Calcination produces a catalyst containing vanadium and bismuth largely in the form of the oxides thereof, but usually the 700°–1600° F. calcination also produces sufficient bismuth vanadate, usually in the form of monoclinic bismuth orthovanadate (BiVO$_4$), to be detected by X-ray diffraction analysis. Bismuth orthovanadate and other bismuth vanadates are usually produced even when impregnation or comulling is accomplished without the deliberate addition of a bismuth vanadate. For example, when silica-alumina is comulled (as in Example I hereinafter) with ammonium metavanadate, then further comulled with an acidic solution of bismuth nitrate, extruded, cut into particulate form, and then calcined at 900°–1000° F., the final product contains sufficient bismuth orthovanadate to be detected by X-ray diffraction analysis.

Although the invention is not to be so limited, it is believed that catalysts containing bismuth vanadate are more active and more stable than catalysts containing no bismuth vanadate. Such is especially believed to be the case with respect to bismuth orthovanadate ($BiVO_4$). It is also believed that the reason the catalyst usually demonstrates higher stability in the presence of water vapor than is the case for catalyts containing only vanadium components or only bismuth components is due to the presence of bismuth vanadate. Hence, catalysts containing a bismuth vanadate, and particularly bismuth orthovanadate, are preferred in the invention.

Finished catalysts herein should contain at least 5.0 weight percent of vanadium and 5.0 weight percent of bismuth, calculated as $V_2O_5$ and $Bi_2O_3$, respectively. It has been found that catalysts containing less than 5.0 weight percent of either metal, while more active or stable than catalysts containing either vanadium components or bismuth components alone, are somewhat less active and less stable than catalysts containing at least 5.0 weight percent of each component. Preferably, the catalyst contains between 5 and 15 weight percent of each component, but it may, if desired, contain up to 40 weight percent of each component. A highly preferred catalyst contains between about 7 and 15 weight percent vanadium as $V_2O_5$ and between about 8 and 20 weight percent bismuth as $Bi_2O_3$, with the most highly preferred catalyst containing at least 8.0 weight percent vanadium components as $V_2O_5$ and at least 10 weight percent bismuth components as $Bi_2O_3$. (All calculations herein with respect to the proportions of active metal components on the catalyst are reported as the weight percent of vanadium and bismuth as $V_2O_5$ and $Bi_2O_3$, respectively. Thus, a catalyst particle weighing 5 grams and containing elemental vanadium, elemental bismuth, bismuth sulfide ($Bi_2S_3$), vanadium sulfide ($V_2S_5$), and bismuth orthovanadate ($BiVO_4$), each in a weight of 0.1 grams, contains vanadium components in a proportion of 5.52 weight percent as $V_2O_5$ and bismuth components in a proportion of 5.48 weight percent as $Bi_2O_3$.)

The following two Examples demonstrate preferred procedures for preparing catalysts useful in the invention.

EXAMPLE I

Four hundred twenty-one grams of 75% $SiO_2$-25% $Al_2O_3$ silica-alumina, commercially sold by the Davison Chemical Division of W. R. Grace & Co. as high alumina cracking catalyst, were placed in a steel muller, to which was added 44.2 grams of ammonium metavanadate ($NH_4VO_3$) and 6 grams of powdered methylated cellulose. The mixture was mulled for 45 minutes. A solution was then prepared by dissolving 88.8 grams of bismuth nitrate ($Bi(NO_3)_3.5H_2O$) in a liquid consisting of 200 cc. water and 32 cc. concentrated nitric acid. The solution was added to the previously mulled mixture, and mulling was continued for 15 minutes. An extrudable paste was then formed by mulling with 71 cc. of water for 15 minutes. The resulting paste was then extruded through a ⅛ inch diameter die and cut into particles having lengths between about ⅛ and ½ inch. The extrudates were then allowed to dry overnight at 230° F. The extrudates were then calcined in the presence of air at 932° F. for 2 hours. The resulting catalyst contained 9.1 weight percent vanadium components (as $V_2O_5$) and 11.2 weight percent bismuth components as $Bi_2O_3$. The catalyst contained an X-ray detectable proportion of bismuth orthovanadate.

EXAMPLE II

Sufficient ammonium metavanadate ($NH_4VO_3$) was mulled with the high alumina silica-alumina described in the preceding Example so that, after extrusion and cutting into ⅛ inch diameter by 1/16-½ inch cylindrical extrudates and calcination at a temperature of about 932° F. for 2 hours in air, the resulting product contained 10 weight percent vanadium components as $V_2O_5$. One hundred grams of such product were then contacted with a solution prepared by dissolving 35 grams of bismuth nitrate ($Bi(NO_3)_3.5H_2O$) in a mixture of 100 cc. water and 15 cc. concentrated nitric acid to which was added sufficient water to provide a solution of 120 cc. volume. The solution was allowed to contact the extrudate material for two hours to insure full impregnation. The extrudate material was then filtered, dried overnight at 230° F., and calcined at 932° F. for two hours in the presence of air. The resulting catalyst contained an X-ray detectable proportion of bismuth orthovanadate and further contained 8.63 weight percent vanadium components as $V_2O_5$ and 11.6 weight percent bismuth components as $Bi_2O_3$.

Catalysts prepared by the foregoing methods or their obvious equivalents have been found to be highly active for the gas phase oxidation of $H_2S$ to either $SO_2$, sulfur, or some percentage combination of both, as desired. In addition, such catalysts are highly selective throughout the temperature range of 250°-900° F., oxidizing $H_2S$ without forming essentially any $SO_3$ and without oxidizing any $H_2$, CO, $NH_3$, or light hydrocarbons which may also be present with the $H_2S$. Of particular importance is the fact that the catalyst is remarkably stable in the presence of water vapor. The life of the catalyst for oxidizing $H_2S$ at temperatures below about 600° F. in the presence of water vapor at a partial pressure of more than about 1.0 psia is at least 90 days, usually at least one year. The catalyst is especially useful for oxidizing $H_2S$ in the presence of water vapor at a partial pressure of at least 1.5 psia, preferably at least 4.0 psia, and particularly at water vapor partial pressures up to about 10.0 psia. Useful results have been obtained, for example, in converting $H_2S$ to elemental sulfur by reaction with oxygen at a temperature of about 380° F. in the presence of water vapor at a partial pressure of about 9.0 psia.

The choice as to whether or not the $H_2S$ in a given gas stream is to be converted to elemental sulfur or $SO_2$ will most likely depend upon local air pollution regulations. Typically, the maximum concentration of $H_2S$ allowable for discharge to the atmosphere is about 10 ppmv while $SO_2$ may be discharged in a maximum concentration varying between about 500 ppmv and 2.0 vol. %. Hence, incineration, i.e., conversion of $H_2S$ to $SO_2$, will usually be directed to gas streams containing between about 10 ppmv and 2.0 vol. % $H_2S$, while the typical gas stream treated for conversion to elemental sulfur will contain at least about 500 ppmv $H_2S$, usually 500 ppmv to 10.0 vol. % $H_2S$, preferably 500 ppmv to 5.0 vol. % $H_2S$, and most preferably 500 ppmv to 2.0 vol. % $H_2S$.

Normally, the gas streams treated in the process of the invention contain, in addition to $H_2S$, any of such components as $N_2$, $CO_2$, CO, $H_2$, $SO_2$, $O_2$, Ar, $NH_3$, $H_2O$, and light hydrocarbons. Typical gas streams for treatment herein include such $H_2S$-containing gas streams as sour natural gases, off-gases derived from geothermal steam, and high temperature, gasified coal or gasified residual oil. The gas stream may also contain such sulfur-containing components as COS, $CS_2$, and light mercaptans (i.e., saturated mercaptans containing no more than six carbon atoms). If such sulfur-containing components are present, it is preferred that the gas stream be pretreated by the process disclosed in U.S. Pat. No. 3,752,877, herein incorporated by reference. According to this process, $CS_2$, COS, and light mercaptans, along with $SO_2$ if present, are simultaneously converted at elevated temperatures (usually 300° to 900° F.) to $H_2S$ by reaction with $H_2$ and/or water vapor in the presence of a catalyst comprising one or more active catalytic components of Co, Mo, Fe, W, Ni, with combinations of Co with Mo or Ni with Mo being most preferred. The pretreated gas stream will then contain $H_2S$ as essentially the only gaseous sulfur components and may be treated by a process described herein so that the $H_2S$ may be converted to $SO_2$ and/or elemental sulfur as desired.

A gas stream especially suited to the foregoing pretreatment method is a Claus tail gas. Other gas streams which are preferably pretreated prior to contact with the catalyst of the invention are those containing olefins or aromatics. Olefins deactivate the catalyst herein by forming gums that deposit on the catalyst surfaces, and aromatics such as benzene, when present in significant proportions, e.g., 100 ppmv, deactivate the catalyst when the operating temperature is below about 350° F. Both types of deactivation, however, are only temporary, the olefin deactivation being overcome by high temperature oxidation of the gum-containing catalyst and the aromatics deactivation by raising the operating temperature above 350° F. Alternatively and more preferably, gas streams containing aromatic or olefin components are pretreated so as to remove these deleterious components prior to contact with the catalyst of the invention. One such pretreatment method, particularly suitable for gas streams containing olefins, is catalytic hydrogenation under the conditions and with the catalyst hereinbefore specified for gas streams containing $SO_2$, $CS_2$, COS, and light mercaptans.

Gas streams to be treated by incineration should either contain sufficient oxygen or be blended with sufficient oxygen or air so as to provide at least the stoichiometric proportion required for:

$$2H_2S + 3O_2 \rightarrow 2SO_2 + 2H_2O \qquad (I)$$

More preferably, oxygen is present in a porportion in excess of stoichiometric, usually in a proportion between about 1.1 and 2.5 times the stoichiometric proportion. Other conditions usually employed in incinerating $H_2S$ in an adiabatic or isothermal reactor include (a) operating pressures between about 5 and 500 psia, with pressure of 15-75 psia being preferred, (b) inlet operating temperatures in the range of 250°-900° F., with temperatures below about 600° F. and especially below about 450° F. being preferred, and (c) space velocities between 100 and 50,000 v/v/hr, with 500-5000 v/v/hr being preferred. Operating conditions are appropriately adjusted so that at least 90% of the $H_2S$ is incinerated to $SO_2$. Preferably, the operating conditions are adjusted so that essentially all the $H_2S$ is incinerated. Conditions known to produce essentially full conversion of $H_2S$ to $SO_2$ include: 450° F., 50 psig, 2000 v/v/hr (gas volume calculated at 60° F.), 2.2 times the stoichiometric proportion of air, and 2700 ppmv $H_2S$ in the feed gas. The following Example III demonstrates the suitability of these conditions.

EXAMPLE III

A feed gas stream having a composition shown in Table I was blended at a rate of 460 scc/min (gas volume measured at 60° F.) with water vapor fed at a rate of 40 scc/min and air fed at the rate of 19.8 scc/min. The resultant gas mixture, having a water vapor content of 7.7 vol. % and an oxygen content of about 0.80 vol. % (2.23 times stoichiometric) was then passed for 15 days at a pressure of 50 psig, a constant temperature of 450° F., and a space velocity of about 2000 v/v/hr through an isothermal catalytic reactor containing 15 cc. of catalyst particles comprising 11.6 weight percent bismuth components (as $Bi_2O_3$) and 8.6 weight percent vanadium components (as $V_2O_5$). The catalyst was prepared as described in Example II, and the water partial pressure within the reactor was about 5.0 psia. The product gas was analyzed on the 15th day by appropriate mass spectrometrical techniques, and the results are reported on an anhydrous basis in Table I. As shown, the $H_2S$ was completely converted to $SO_2$, and no $H_2$ or methane was oxidized. The $SO_3$ content of the effluent gas was determined to be from 3 to 5.0 ppm.

TABLE I

|  | Feed Composition | Product Composition |
|---|---|---|
| Hydrogen | 873 ppmv | 838 ppmv |
| Methane | 1.68 vol. % | 1.60 vol. % |
| Nitrogen | 0 ppmv | 2.77 vol. % |
| Oxygen | 0 ppmv | 0.43 vol. % |
| Argon | 3 ppmv | 365 ppmv |
| Carbon Dioxide | 97.96 vol. % | 94.85 vol. % |
| Hydrogen Sulfide | 2717 ppmv | 0 ppmv |
| Methyl Mercaptan | 2 ppmv | 0 ppmv |
| Carbonyl Sulfide | 4 ppmv | 0 ppmv |
| Sulfur Dioxide | 36 ppmv | 2212 ppmv |
| Carbon Disulfide | 0 ppmv | 0 ppmv |
| Total Sulfur Compounds as $SO_2$[1] | 2759 ppmv | 2212 ppmv |

Note:
[1] The reason a lower concentration of total sulfur compounds was found in the product gas than in the feed was due to dilution by the blend of air oxidant and also by the fact that on the 15th day of operation the $H_2S$ concentration in the feed was somewhat lower than shown in Table I.

EXAMPLE IV

Six differently prepared catalysts were tested under the conditions of Example III to determine how active and stable they were for incinerating $H_2S$ in the presence of 5.0 psia water vapor pressure. The six catalysts were prepared as follows:

10 weight percent $V_2O_5$ on silica-alumina

A mixture of ammonium vanadate and the high alumina cracking catalyst described in Example I were mulled in the presence of sufficient water to create a paste suitable for extrusion. The paste was extruded through a ⅛ inch die, cut into pieces about 1/16-½ inch in length, dried at 230° F., and calcined in air at 932° F. for two hours. The catalyst consisted of 10 weight percent vanadium components (calculated as $V_2O_5$) and silica-alumina (75% silica-25% alumina).

36.6 weight percent $V_2O_5$ on silica-alumina

One hundred and eight grams of ammonium metavanadate, 291 grams of the high alumina silica-alumina described in Example I, and 7.74 grams of methylated cellulose were mulled in the presence of sufficient water to produce an extrudable paste. The paste was then extruded and cut into ⅛ inch diameter by 1/16-½ inch long cylindrical pieces. The extrudates were dried overnight at 230° F. and calcined at 932° F. for two hours in the presence of air. The catalyst so produced contained 36.6 weight percent vanadium components (calculated as $V_2O_5$) on silica-alumina (75% $SiO_2$-25% $Al_2O_3$).

10.2 weight percent $Bi_2O_3$ on alumina

This catalyst was prepared according to a method similar to that taught in Example I of U.S. Pat. No. 4,012,486. The procedure utilized was as follows:

17 gm $BiCl_3$ was dissolved in 40 cc. water to which was added 40 cc. concentrated hydrochloric acid. The solution was then diluted with 100 cc. water. The solution so produced was allowed to contact 100 grams of gamma alumina 1/16 inch diameter extrudates for two hours. The excess liquid was then decanted off, and the impregnated extrudates were washed with a solution consisting of 30% concentrated $NH_4OH$ and 70% water until the extrudates were chloride free. The extrudates were then washed with 500 cc. water and calcined for 2 hours at 932° F. The catalyst contained 10.2% bismuth components (calculated at $Bi_2O_3$) supported on gamma alumina.

4.5 weight percent $Bi_2O_3$-9.4 weight percent $V_2O_5$ on silica alumina

This catalyst was prepared by first preparing the 10 weight percent $V_2O_5$ on silica-alumina catalyst as described above. One hundred grams of this catalyst was contacted with a solution prepared by first dissolving 11.6 gm bismuth nitrate in 100 cc. water to which was added 5 cc. concentrated nitric acid, and then further adding sufficient water to make the solution up to 120 cc. The contacting time was 2 hours, after which the excess liquid was decanted off. The impregnated extrudates were then dried at 230° F. overnight and calcined for 2 hours at 932° F. in the presence of air. The finished catalyst contained 4.5 weight percent bismuth components (calculated as $Bi_2O_3$) and 9.4 weight percent vanadium components (calculated as $V_2O_5$). By X-ray diffraction analysis, it was determined that the finished catalyst contained bismuth orthovanadate.

7.95 weight percent $Bi_2O_3$-9.0 weight percent $V_2O_5$ on silica alumina

This catalyst was prepared according to the method shown above for the 4.5 weight percent $Bi_2O_3$-9.4 weight percent $V_2O_5$ catalyst except that the impregnating solution was prepared as follows: 23.2 gm bismuth nitrate were dissolved in 100 cc. of water plus 10 cc. nitric acid. The solution was then sufficiently diluted with water to provide a total volume of 120 cc. The finished catalyst contained 7.95 weight percent of bismuth components (as $Bi_2O_3$) and 9.0 weight percent vanadium components (as $V_2O_5$). The catalyst was found by X-ray diffraction analysis to contain bismuth orthovanadate.

11.6 weight percent $Bi_2O_3$-8.63 weight percent $V_2O_5$ on silica-alumina

This catalyst was prepared according to the method shown in Example II.

Each of the foregoing catalyst was utilized to incinerate $H_2S$ to $SO_2$ under the conditions recited in Example III. The only condition which was varied for the individual catalysts was operating temperature. After operating with the various catalysts for several days duration at temperatures varying between about 450° and 510° F., the stability of each catalyst was determined by comparing the concentration of unreacted $H_2S$ in a sample of the product gas at a specified operating temperature early in the run versus the concentration of unreacted $H_2S$ in a sample of the product gas produced at the same specified temperature later in the run. The data so obtained are tabulated in Table II, and the stabilities of the various catalysts, in terms of the increase of unreacted $H_2S$ in the product gas per day, are also tabulated in Table II. As shown, the catalysts which proved most stable were those consisting of bismuth components or bismuth and vanadium components as the essential active catalytic components. Catalysts containing only vanadium components as the essential active catalytic components deactivated at unacceptably high rates. The most stable catalysts were those containing bismuth and vanadium components in proportions of at least about 8.0 weight percent and 7.0 weight percent, respectively. Such catalysts proved remarkably more stable than the 10% or 36.6% $V_2O_5$ catalyst and roughly twice as stable as the 10.2% $Bi_2O_3$ catalyst.

Also significant is the fact that the two catalyst containing at least about 8.0 weight percent bismuth components and at least about 7.0 weight percent vanadium components maintained an $H_2S$ concentration in the product below about 3.5 ppmv in comparison to about 6 ppmv for the vanadium-bismuth catalyst containing only 4.5 weight percent bismuth. Many environmental regulations permit no more than about 10 ppmv of $H_2S$ to be discharged to the atmosphere, and it can be seen that the two vanadium-bismuth catalysts containing at least about 8.0 weight percent bismuth components provide activity and stability that will insure against reaching such high levels of $H_2S$ in the product gas whereas the 4.5 weight percent bismuth-9.4 weight percent vanadium catalyst is less suitable for this purpose. Of special note is the high stability of the 11.6 weight percent bismuth-8.63 weight percent vanadium catalyst. Because of the high stability and high activity of this catalyst, it and other catalysts containing at least 10 weight percent bismuth components, calculated as $Bi_2O_3$, and at least 8.0 weight percent vanadium components, calculated as $V_2O_5$, are most highly preferred in the invention.

TABLE II

| Catalyst | ppmv $H_2S$ in Product at Time, $t_1$ | ppmv $H_2S$ in Product at Time, $t_2$ | Operating Temperature, °F. | $t_2 - t_1$ Days | Deactivation Rate[1], ppmv $H_2S$/day |
|---|---|---|---|---|---|
| 10% $V_2O_5$ | 1.5 | 46.8 | 500 | 7.5 | 6.04 |
| 36.6% $V_2O_5$ | 1.5 | 51.5 | ~450 | 16.9 | 2.96 |
| 10.2% $Bi_2O_3$ | 3.3 | 12.2 | 510 | 14.1 | 0.63 |
| 4.5% $Bi_2O_3$—9.4% $V_2O_5$ | 2.9 | 6.0 | 450 | 9.9 | 0.31 |
| 7.95% $Bi_2O_3$—9.0% $V_2O_5$ | 1.4 | 3.5 | 450 | 6.0 | 0.35 |
| 11.6% $Bi_2O_3$—8.63% $V_2O_5$ | 0.5 | 3.0 | 450 | 11.0 | 0.23 |

[1]Deactivation Rate = (ppmv $H_2S$ in product at $t_2$ − ppmv $H_2S$ in product $t_1$) ÷ ($t_2 - t_1$) days.

EXAMPLE V

To compare the initial activities of the catalysts of the invention with those of the prior art, data comparing the product $H_2S$ obtained at various temperatures in the runs of Example IV prior to any significant catalyst deactivation were tabulated in Table III. Also tabulated in Table III were data obtained from an experiment run under the same conditions of Example III but using a catalyst consisting of 13.0 weight percent $Bi_2O_3$ and silica-alumina (75% $SiO_2$-25% $Al_2O_3$), which catalyst was prepared by impregnating silica-alumina extrudates with a bismuth nitrate solution followed by calcination at 932° F. for two hours in the presence of air.

As shown in Table III, the vanadia and vanadium-bismuth catalysts had comparable activities under the conditions of the experiment, leaving almost no unreacted $H_2S$ at temperatures in the 420°–450° F. range. On the other hand, the 10.2% and 13.0% bismuth catalysts were only useful at temperatures above about 500° F. At temperatures in the 490°–500° F. range, the two bismuth catalysts both showed evidence of loss of activity, with unreacted $H_2S$ being as high as 50 ppmv. Thus, the vanadia and vanadium-bismuth containing catalysts exhibited substantially better activity for the conversion of $H_2S$ to $SO_2$ than the catalysts containing only bismuth components as the essential active catalytic components.

TABLE III

| Catalyst | Temperature, °F. | ppmv $H_2S$ |
|---|---|---|
| 10% $V_2O_5$ | 445 | 4.4 |
|  | 490 | 3.4 |
|  | 500 | 1.5 |
| 36.6% $V_2O_5$ | 400 | 25 |
|  | 410 | 17 |
|  | 420 | 4.8 |
|  | 440 | 1.5 |
| 10.2% $Bi_2O_3$ | 500 | 50 |
|  | 510 | 11.8–13.4 |
|  | 520 | 3.3–8.6 |
|  | 530 | 3.6 |
| 13.0% $Bi_2O_3$ | 490 | 17.1 |
|  | 500 | ~1.0 |
|  | 510 | 0.9 |
| 4.5% $Bi_2O_3$—9.4% $V_2O_5$ | 440–450° F. | 1.7–6.0 |
| 7.95% $Bi_2O_3$—9.0% $V_2O_5$ | 450–460° F. | 1.1–3.5 |
| 11.6% $Bi_2O_3$—8.63% $V_2O_5$ | 450–470° F. | 0.3–4.5 |

The catalysts of the invention may also be utilized to oxidize $H_2S$ to elemental sulfur as well as for incineration to $SO_2$. To produce elemental sulfur, conditions are usually chosen for adiabatic or isothermal reactors from the following ranges: 250° to 900° F., 100 to 10,000 v/v/hr, and 5 to 75 psia, preferably from the following ranges: 275° to 475° F., 200 to 2500 v/v/hr, and 15 to 30 psia, and most preferably: 275° to 425° F., 500 to 1500 v/v/hr, and 15 to 20 psia. In addition, the inlet temperature is preferably maintained below about 400° F., most preferably below 350° F., with at least some $H_2S$ being converted to elemental sulfur below such temperatures. An oxidant gas is also necessary, so oxygen, usually supplied in the form of air, is blended with the feed gas stream so as to produce sulfur vapor according to the following reaction:

$$2H_2S + O_2 \rightarrow 2S + 2H_2O \qquad (II)$$

Most preferably, the amount of air or oxygen so blended with the feed gas is such that oxygen is present in a proportion near or at the stoichiometric proportion for Reaction (II), usually between about 0.9 and 1.1 times the stoichiometric proportion. As is well-known, the highest possible conversions of $H_2S$ to sulfur are accomplished when oxygen is available in its stoichiometric proportion. Also contributing to high sulfur yields are low water vapor partial pressures and temperatures below about 475° F., particularly below about 450° F., with sulfur yields increasing with decreasing temperature and decreasing water vapor partial pressure.

It is, of course, well-known that $SO_2$ may be used in place of oxygen for the conversion of $H_2S$ to sulfur, the sulfur being formed by the following reaction:

$$2H_2S + SO_2 \rightarrow 3S + 2H_2O \qquad (III)$$

Thus, if $SO_2$ is present in the feed gas stream in any $H_2S$ to $SO_2$ ratio greater than 2.0, oxygen need only be added in an amount sufficient to react with the $H_2S$ not converted by Reaction (III). In other words, if the ratio of $H_2S$ to $SO_2$ is greater than 2.0, than the stoichiometric proportion of oxygen is that proportion sufficient to provide a molar or volumetric ratio of $H_2S$ to ($SO_2 + O_2$) equal to 2.0.

For feed gases inherently containing $H_2S$ and $SO_2$ in an $H_2S$ to $SO_2$ ratio less than 2.0, the highest possible conversions to sulfur are obtained by firstly pretreating the feed so as to convert the $SO_2$ to $H_2S$, as by the method shown hereinbefore in U.S. Pat. No. 3,752,877, and then blending the pretreated gas with sufficient oxygen or air to provide an $H_2S$ to $O_2$ ratio equal to 2.0. For feed gases containing $H_2S$ to $SO_2$ in a ratio equal to 2.0, no pretreatment or addition of oxygen is necessary; the catalyst may be used for the direct conversion of $H_2S$ to sulfur via Reaction (III).

In view of the foregoing, it should be apparent that, when elemental sulfur is desired, $SO_2$ may be utilized as an alternative oxidant to oxygen. That is, for any gas stream containing $H_2S$, elemental sulfur may be produced herein by blending either $SO_2$ or oxygen oxidant with the gas stream such that a ratio of $H_2S$ to oxidant of 2.0 is provided. However, oxygen is inherently superior to $SO_2$, not only because of its ready availability in the form of air but also due to the higher conversions to sulfur obtainable therewith. A comparison of Reactions (II) and (III) reveals that, for the same amount of $H_2S$ converted to sulfur, 50% more sulfur is formed by Reaction (III) with $SO_2$ oxidant than by Reaction (II) with $O_2$ oxidant. The formation of 50% more sulfur by Reaction (III) necessitates higher operating temperatures for Reaction (III) than for Reaction (II) if the sulfur vapor dew point is not to be exceeded. But at operating temperatures below 1000° F., the conversion of $H_2S$ to sulfur decreases with increasing temperature. Thus, because $H_2S$ can be converted to sulfur by Reaction (II) at a lower temperature than Reaction (III) without exceeding the dew point, an inherent advantage—i.e., a higher conversion—is obtained when oxygen is used as oxidant than when $SO_2$ is utilized.

Whether oxygen or $SO_2$ is utilized as oxidant, it will be found that the catalyst of the invention is highly useful for converting $H_2S$ to elemental sulfur. The percentage conversion in any given situation, of course, will depend upon such factors as operating temperature, operating pressure, water vapor partial pressure, and choice of oxidant. But the vanadium-bismuth catalysts disclosed hereinbefore usually provide a conversion of $H_2S$ to elemental sulfur within 10%, often within 5%, of theoretical. And because of their high activity for converting $H_2S$ to sulfur, the vanadium-bismuth catalyst of the invention provides high conversions of $H_2S$ to sulfur under lower operating temperature and/or higher space velocity conditions than are required for comparable prior art catalysts, such as the vanadia catalyst disclosed in U.S. Patent Application Ser. No. 700,513 filed June 28, 1976, now U.S. Pat. No. 4,243,647.

The following Example demonstrates the high activity of vanadium-bismuth catalysts for oxidizing $H_2S$ to elemental sulfur.

EXAMPLE VI

A catalyst was prepared containing 8.7 weight percent vanadium components, as $V_2O_5$, and 12.9 weight percent bismuth components, as $Bi_2O_3$, and the balance being a support consisting of silica-alumina having a 25% by weight alumina content. The catalyst was in particulate form, had a surface area of 239 $m^2/gm$, and a compact bulk density of 0.67 g/cc. (This catalyst was prepared in a manner very similar to that described in Example II.)

The foregoing catalyst (950 gm) was charged to an isothermal reactor and utilized to treat a feed gas containing (on an anhydrous basis) about 99% $CO_2$ and $H_2S$ in a concentration varying between about 750 ppmv and 1200 ppmv. Air was blended with the feed gas such that stoichiometric oxygen was available within a 10% tolerance to oxidize the $H_2S$ in the feed gas to sulfur. Elemental sulfur produced in the reactor was removed therefrom in the vapor form and recovered by condensation. The experiment was conducted over a time period of more than 5 months, and the data shown in Table IV were derived from analyses of samples of the feed and product gases when the operating conditions were those shown in Table IV.

It is noted with respect to the foregoing experiment that the catalyst throughout the run evinced no deactivation, except when the operating temperature fell below the sulfur vapor dew point temperature and sulfur deposited on the catalyst. Such deactivations, however, were only temporary, elevated temperatures restoring the catalyst to full activity.

experiments were conducted with water vapor at partial pressures between about 2.5 and 5.0 psia is taken into consideration. As those skilled in the art are aware, increasing the amount of water vapor tends to increase the light-off temperature for a catalyst by increasing the amount of water vapor adsorbed on the catalytic surfaces, thereby reducing the amount of adsorbed $H_2S$ and $O_2$ (or $SO_2$). Yet despite the adverse condition of 3.0 psia water vapor, the catalyst of the invention still exhibited activity for lighting off the reaction of $H_2S$ with oxygen at about 285° F. whereas a comparable vanadia catalyst under the more favorable condition of less than 0.7 psia water vapor is useful only at temperatures at or above about 375° F.

Another surprising aspect of the invention as shown by the data in Table IV is the high stability of the vanadium-bismuth catalyst in the presence of water vapor. As shown by the data in Table II, vanadia catalysts deactivate rapidly in the presence of water vapor at temperatures below about 600° F., but the data in Table IV show that vanadium-bismuth catalysts resist such deactivation even when utilized in the presence of 2.5 to 5.0 psia water vapor for a time period of greater than 5 months.

In a specific embodiment of the invention particularly useful for treating feed gas streams containing between about 5 and 40 volume percent $H_2S$, especially when the feed gas stream contains water vapor at relatively high partial pressures, e.g., above about 2.0 psia and, more usually, above about 4.0 psia, the feed gas stream is blended with air, preferably in a stoichiometric amount, and the resulting blended gases are passed through an adiabatic reactor containing a particulate vanadium-bismuth catalyst under conditions described hereinbefore such that a substantial proportion of the $H_2S$ is converted to elemental sulfur vapor. The product gas containing elemental sulfur is passed to a sulfur condenser or other suitable means for separating sulfur from the product gas, leaving a purified product gas containing residual $H_2S$. A portion of the purified product gas is then recycled and blended with the feed gas such that the blend of feed gas, air, and recycle gas entering the reactor contains $H_2S$ in a predetermined

TABLE IV

| Sample No. | 809 | 1232 | 1520 | 1544 | 1568 | 1716 | 1764 | 2130 | 2150 | 2322 |
|---|---|---|---|---|---|---|---|---|---|---|
| Water Vapor Pressure, psia | 3 | 3 | 3 | 3 | 3 | 5 | 5 | 5 | 2.5 | 5.0 |
| Operating Pressure, psia | 300 | 300 | 300 | 300 | 300 | 300 | 300 | 300 | 150 | 300 |
| Operating Temperature, °F. | 381 | 334 | 305 | 295 | 285 | 310 | 300 | 410 | 410 | 410 |
| Feed $H_2S$, ppmv | 1050 | 1050 | 852 | 875 | 875 | 780 | 890 | 1132 | 1032 | 1137 |
| Product $H_2S$, ppmv | 68 | 48 | 44 | 29 | 84 | 111 | 120 | 143 | 213 | 162 |
| Product $SO_2$, ppmv | 88 | 45 | 47 | 73 | 25 | 40 | 62 | 65 | 64 | 86 |
| Sulfur Yield, % | 77.7 | 83.8 | 82.3 | 81.3 | 77.4 | 75.4 | 75.7 | 77.0 | 70.4 | 68.7 |
| GHSV (at 60° F. and 1 atm) | 750 | 750 | 750 | 750 | 750 | 750 | 750 | 750 | 750 | 975 |

As shown by the data in Table IV, the vanadium-bismuth catalyst of the invention is active for lighting off the conversion of $H_2S$ to sulfur at temperatures below 300° F. This result is considered surprising for a number of reasons, not the least of which is that a comparable prior art catalyst—and one known to be highly active for the conversion of $H_2S$ to elemental sulfur, i.e., a 10% $V_2O_5$ on 75% $SiO_2$-25% $Al_2O_3$ catalyst—is active for lighting off the oxidation of $H_2S$ to sulfur in the presence of water vapor at partial pressures less than about 0.7 psia only at temperatures at or above about 375° F. Thus, the catalyst of the invention proves to be substantially more active than comparable vanadia catalysts for the conversion of $H_2S$ to elemental sulfur, and such is yet more surprising when the fact the foregoing range, such as 3 to 6 volume percent, or below a predetermined maximum, typically and preferably, 5 volume percent. The remaining portion of the purified product gas is treated by any of three methods. The three methods (which are applicable to any embodiment of the invention in which the $H_2S$ content of a gas stream recovered after treatment with the vanadium-bismuth catalyst is too high for discharge to the atmosphere) are:

(1) If the $H_2S$ to $SO_2$ volumetric ratio in the purified product gas stream is about 2.0, the gas stream may be contacted with any porous refractory oxide-containing catalyst, such as alumina, under conditions of elevated temperature, e.g., 400° to 900° F., such that a substantial proportion of the H$_2$S is converted by Reaction (III) to elemental sulfur, which is then recovered, as by condensation. In this embodiment of the invention, it is most preferred that a vanadium-bismuth catalyst as described hereinbefore be utilized to carry out the conversion to sulfur, such catalysts having far greater activity than typical alumina catalysts and therefore being useful for providing the same conversion of H$_2$S to sulfur as alumina, but under the more difficult conditions of lower operating temperature and/or higher space velocity.

(2) If the H$_2$S to SO$_2$ volumetric ratio is substantially above 2.0, or if one desires to allow for fluctuations in the H$_2$S to SO$_2$ ratio in the purified product gas stream, the purified product gas stream is blended with sufficient air to provide a volumetric ratio of H$_2$S/(SO$_2$+O$_2$) of about 2.0, and the resulting mixed gases are then contacted with a vanadium-bismuth catalyst under conditions hereinbefore disclosed for conversion to elemental sulfur. Alternatively but less preferably, a vanadia catalyst consisting essentially of a vanadium oxide or sulfide on a porous refractory oxide support may be substituted for the vanadium-bismuth catalyst, provided the water vapor of the mixed gases in contact therewith is at a partial pressure below about 1.0 psia or the operating temperature is above about 600° F. Use of the vanadia catalyst provides less activity for the conversion of H$_2$S to sulfur than is the case with vanadium-bisumth catalysts, but the lower activity may be suitable in certain instances, as when cost of the catalyst is of special importance.

(3) If the H$_2$S content of either the purified product bas stream or the gas streams recovered after sulfur condensation from methods (1) and (2) above is too high for discharge to the atmosphere, but such gas streams could be discharged to the atmosphere if the H$_2$S were converted to SO$_2$ (due to less stringent air pollution standards for SO$_2$ than for H$_2$S), such gas streams are subjected to incineration to convert the H$_2$S therein to SO$_2$. The incineration may be accomplished thermally at temperatures above about 1000° F. in the presence of excess oxygen, but it is preferred that the incineration be accomplished catalytically by contact with the vanadium-bismuth catalyst of the invention as described hereinbefore under the range of conditions for conversion to SO$_2$ as also described hereinbefore. Use of the vanadium-bismuth catalyst provides a distinct advantage over thermal incineration in that the gas stream to be treated does not require as much preheating, the vanadium-bismuth catalyst being active for the conversion of H$_2$S to SO$_2$ at temperatures substantially below 500° F.

Although the invention has been described in conjunction with specific examples and embodiments thereof, it is evident that many alterations, modifications, and variations will be apparent to those skilled in the art in light of the foregoing description. For example, it should be self-evident that the catalytic process of the invention may easily be modified to oxidize H$_2$S to any desired percentage combination of sulfur and SO$_2$ by simply controlling the proportion of oxygen between the amount required for Reaction (I) and that required for Reaction (II). Accordingly, it is intended in the invention to embrace these and all such alternatives, modifications, and variations as may fall within the spirit and scope of the appended claims.

We claim:

1. A process for oxidatively removing H$_2$S from a feed gas stream, said process comprising:
    (1) contacting said feed gas stream in admixture with an oxidant gas comprising oxygen or SO$_2$ with a catalyst comprising vanadium and bismuth active catalytic components in a first reaction zone wherein a substantial proportion of said H$_2$S is converted to elemental sulfur at temperatures between about 250° and 475° F., but a residual proportion of H$_2$S remains; and
    (2) contacting at least a portion of said residual H$_2$S, in admixture with an oxidizng gas comprising sufficient oxygen to provide an excess thereof for the conversion to SO$_2$, with a catalyst in a second reaction zone maintained at a temperature between about 250° and 900° F., said catalyst in said second reaction zone comprising vanadium and bismuth active catalytic components on a carrier material, said vanadium and bismuth catalytic components each being present in a proportion above about 5 percent by weight, calculated as V$_2$O$_5$ and Bi$_2$O$_3$, respectively, and said contacting in said second reaction zone being such that at least 90% of the residual H$_2$S contacted in said second reaction zone is converted to SO$_2$ without the formation of a substantial amount of SO$_3$.

2. A process as defined in claim 1 wherein said oxidant gas stream in step (1) comprises oxygen.

3. A process for oxidatively removing H$_2$S from a feed gas stream, said process comprising:
    (1) contacting said feed gas stream in admixture with an oxidant gas comprisng oxygen or SO$_2$ with a particulate catalyst comprising vanadium and bismuth active catalytic components in a first reaction zone wherein a substantial proportion of said H$_2$S is converted to elemental sulfur at temperatures between about 250° and 475° F., but a residual proportion of H$_2$S remains, and
    (2) contacting at least a portion of said residual H$_2$S, in admixture with an oxidizing gas comprising sufficient oxygen to provide an excess thereof for the conversion to SO$_2$, with a particulate catalyst in a second reaction zone maintained at a temperature between about 250° and 900° F., said particulate catalyst in said second reaction zone consisting essentially of vanadium and bismuth active catalytic components on a carrier material under conditions such that at least 90% of the residual H$_2$S contacted in said second reaction zone is converted to SO$_2$ without the formation of essentially any SO$_3$.

4. A process as defined in claim 3 wherein said oxidant gas in step (1) comprises oxygen.

5. A process for oxidatively removing H$_2$S from a feed gas stream also containing water vapor, said process comprising:
    (1) contacting said feed gas stream in admixture with an oxidant gas comprising oxygen or SO$_2$ with a solid catalyst comprising vanadium and bismuth active catalytic components in a first reaction zone wherein a substantial proportion of said H$_2$S is converted to elemental sulfur at temperatures between about 250° and 475° F., but a residual proportion of H$_2$S remains, and
    (2) contacting at least a portion of said residual H$_2$S, in admixture with an oxidizing gas comprising oxygen, with a solid catalyst in a second reaction zone maintained at a temperature between about 250° and 600° F. and at contacting pressures between about 5 and 500 p.s.i.a., and in the presence of water vapor at a partial pressure of more than about 1.0 p.s.i.a., with the essential active catalytic components of said solid catalyst in said second reaction zone comprising at least 5 weight percent vanadium, calculated as $V_2O_5$, and at least 5 weight percent bismuth, calculated as $Bi_2O_3$, said contacting in said second reaction zone being such that a substantial proportion of the residual $H_2S$ contacted in said second reaction zone reacts with oxygen to produce $SO_2$, with said catalyst in said second reaction zone being more resistant to deactivation for the conversion of $H_2S$ to $SO_2$ under the conditions maintained in the second reaction zone than a comparable vanadium catalyst free of bismuth.

6. A process as defined in claim 5 wherein said oxidant gas in step (1) comprises oxygen.

7. A process for oxidatively removing $H_2S$ from a feed gas stream also containing water vapor, said process comprising:

(1) contacting said feed gas stream in admixture with an oxidant gas comprising oxygen or $SO_2$ with a particulate catalyst comprising vanadium and bismuth active catalytic components in a first reaction zone wherein a substantial proportion of said $H_2S$ is converted to elemental sulfur at temperatures between about 250° and 475° F., but a residual proportion of $H_2S$ remains, and (2) contacting at least a portion of said residual $H_2S$, in admixture with an oxidizing gas comprising sufficient oxygen to provide an excess thereof for the conversion to $SO_2$, with a particulate catalyst in a second reaction zone maintained at a temperature between about 250° and 600° F. and at contacting pressures between about 5 and 500 p.s.i.a. and in the presence of water vapor at a partial pressure of at least about 1.5 p.s.i.a., said catalyst in said second reaction zone consisting essentially of vanadium and bismuth active catalytic components on a porous refractory oxide carrier material, at least some of which vanadium and bismuth components are present in the form of vanadium oxides or sulfides and bismuth oxides and sulfides, respectively, said contacting in said second reaction zone being such that at least 90% of the residual $H_2S$ contacted in said second reaction zone is converted to $SO_2$, with said process being carried out for at least 90 days of operation while each of said catalysts maintains substantially undiminished activity for the respective conversions to elemental sulfur and $SO_2$.

8. A process as defined in claim 7 wherein said oxidant gas in step (1) comprises oxygen.

9. A process for oxidatively removing $H_2S$ from a feed gas stream also containing water vapor, said process comprising:

(1) contacting said feed gas stream in admixture with oxygen or $SO_2$ with a solid catalyst comprising vanadium and bismuth active catalytic components in a first reaction zone wherein a substantial proportion of said $H_2S$ is converted to elemental sulfur at temperatures between about 250° and 475° F., but a residual proportion of $H_2S$ remains, and (2) contacting at least a portion of said residual $H_2S$, in admixture with an oxidizing gas comprising excess oxygen over that required for the conversion to $SO_2$ in a second reaction zone maintained at a temperature between about 250° and 600° F. and at contacting pressures between about 5 and 500 p.s.i.a., and in the presence of water vapor at a partial pressure of more than about 1.5 p.s.i.a., with a solid catalyst whose essential active components comprise vanadium and bismuth each in a proportion above about 5 percent by weight, calculated as $V_2O_5$ and $Bi_2O_3$, respectively, with the conditions in said second reaction zone being such that a substantial proportion of the residual $H_2S$ contacted therein is converted to $SO_2$, and with said catalyst in said second reaction zone having a deactivation rate no greater than about 0.35 vppm $H_2S$ per day when tested for the conversion of $H_2S$ to $SO_2$ under the following conditions: 450° F., 50 p.s.i.g., and 2000 v/v/hr with a blended gas stream comprising a gas stream containing about 2717 vppm $H_2S$, about 97.96 volume percent $CO_2$, about 1.68 vol. % volume percent $CH_4$, and about 873 vppm $H_2$ blended with sufficient air and water vapor to provide an oxygen content of about 0.80 volume percent and a water vapor content of about 7.7 volume percent in said blended gas stream.

10. A process as defined in claim 9 wherein said oxidant gas in step (1) comprises oxygen.

11. A process as defined in claim 2, 4 or 6 wherein the water vapor partial pressure in both reaction zones is above about 1.0 p.s.i.a.

12. A process as defined in claim 2 or 8 wherein temperature is maintained in said first reaction zone between about 250° and 450° F.

13. A process as defined in claim 2, 4, or 8 wherein said oxidant gas and oxidizing gas in steps (1) and (2), respectively, comprise air, and wherein the oxygen content of said oxidant gas in step (1) is such that essentially the stoichiometric proportion of oxygen necessary for the conversion of said $H_2S$ in said feed gas to elemental sulfur is present, and wherein said catalysts in steps (1) and (2) both comprise a vanadium oxide or sulfide and a bismuth oxide or sulfide.

14. A process as defined in claim 2 or 6 wherein elemental hydrogen is also present in said feed gas, said elemental hydrogen remaining essentially completely unoxidized in steps (1) and (2) and being recovered with said product gas stream.

15. A process as defined in claim 2, 4, 8 or 10 wherein ammonia is present in said feed gas, said ammonia remaining essentially completely unoxidzed in steps (1) and (2) and being recovered with said product gas stream.

16. A process as defined in claim 2 or 8 wherein said catalysts in steps (1) and (2) both comprise a bismuth vanadate.

17. A process as defined in claim 2 or 6 wherein the contacting in step (1) is accomplished at a temperature between about 250° and 450° F., the contacting in both steps (1) and (2) is in the presence of water vapor at a partial pressure of at least 1.5 p.s.i.a., and the catalysts in both steps (1) and (2) consist essentially of about 7 to about 15 weight percent vanadium components, calculated as $V_2O_5$, and between about 8 and 20 weight percent bismuth components, calculated as $Bi_2O_3$, on a carrier material.

18. A process as defined in claim 2, 4, or 10 wherein said catalysts in steps (1) and (2) maintain substantially undiminished activity for a time period of 90 days of operation.

19. A process as defined in claim 2 or 6 wherein said catalysts in steps (1) and (2) each consists essentially of at least about 5 weight percent vanadium components, calculated as $V_2O_5$, and between about 8 and 20 weight percent bismuth components, calculated as $Bi_2O_3$, on a refractory oxide support.

20. A process as defined in claim 19 wherein said catalysts in steps (1) and (2) each comprises at least 7 weight percent vanadium components, calculated as $V_2O_5$.

21. A process as defined in claim 2, 6, or 8 wherein said catalysts in steps (1) and (2) each comprise about 7 to about 15 weight percent vanadium components, calculated as $V_2O_5$, and about 8 to about 20 weight percent bismuth components, calculated as $Bi_2O_3$, on a carrier material.

22. A process as defined in claim 21 wherein said catalysts in steps (1) and (2) each comprise a carrier material selected from the group consisting of refractory oxides, hydrophobic crystalline silicas, amorphous aluminosilicate zeolites, crystalline aluminosilicate zeolites, and mixtures thereof.

23. A process as defined in claim 4 or 8 wherein the initial contacting in step (1) is at a temperature below about 350° F., with at least some of said $H_2S$ reacting with said oxygen to produce elemental sulfur at temperatures below 350° F.

24. A process as defined in claim 4 or 8 wherein said oxidant gas in step (1) comprises air and the oxygen content of said oxidant gas is such that said oxygen in said first reaction zone is present in a proportion between about 0.9 and 1.1 times the stoichiometric proportion necessary for the conversion of said $H_2S$ to elemental sulfur.

25. A process as defined in claim 24 wherein the initial contacting in step (1) is at a temperature below about 300° F., with at least some of said $H_2S$ reacting with said oxygen to produce elemental sulfur at temperatures below 300° F.

26. A process as defined in claim 2 or 8, and wherein said oxidant gas and oxidizing gas in steps (1) and (2), respectively, comprise air, with recovery of elemental sulfur between steps (1) and (2), and also with recovery of a purified product gas, at least a portion of which, containing residual $H_2S$, is subsequently introduced into step (2), wherefrom an essentially $H_2S$-free gas stream is discharged from step (2).

27. A process as defined in claim 26 wherein a portion of said purified product gas is recycled to step (1), and wherein said feed gas stream contains between about 5 and 40 volume percent $H_2S$, and wherein the portion of said purified product gas recycled to step (1) is sufficient to produce an $H_2S$ concentration in the admixture contacted in said first reaction zone at a predetermined value lower than 10 volume percent and lower than the $H_2S$ concentration of said feed gas stream.

28. A process as defined in claim 26 wherein said catalysts in steps (1) and (2) consist essentially of at least 8 weight percent vanadium components, calculated as $V_2O_5$, and between about 10 and 20 weight percent bismuth components, calculated as $Bi_2O_3$, on a porous refractory oxide, and wherein the oxygen content of said oxidant gas in step (1) is between about 0.9 and 1.1 times the stoichiometric amount required for conversion of said $H_2S$ in said feed gas stream to elemental sulfur, and wherein at least some conversion to sulfur in step (1) takes place at a temperature below about 400° F.

29. A process as defined in claim 28 wherein said feed gas stream contains hydrogen or ammonia, said hydrogen or ammonia remaining essentially completely unoxidized in steps (1) and (2) and being discharged with said $H_2S$-free gas stream.

30. A process as defined in claim 28 wherein at least some conversion to elemental sulfur in step (1) takes place at a temperature below about 350° F.

31. A process as defined in claim 30 wherein the water vapor partial pressure in both reaction zones is at least 1.5 p.s.i.a.

32. A process as defined in claim 28 wherein at least some conversion to elemental sulfur in step (1) takes place at a temperature below about 300° F.

33. A process as defined in claim 32 wherein said feed gas stream contains hydrogen or ammonia, said hydrogen or ammonia remaining essentially completely unoxidized in steps (1) and (2) and being discharged with said $H_2S$-free gas stream.

34. A process as defined in claim 30 wherein said catalysts in steps (1) and (2) comprise the same or different carrier material selected from the group consisting of (1) alumina and (2) silica-alumina containing between about 20 and 30 weight percent alumina.

35. A process as defined in claim 2, 4, or 8 wherein said catalysts in steps (1) and (2) comprise the same or different carrier material selected from the group consisting of (1) alumina and (2) silica-alumina containing between about 20 and 30 weight percent alumina.

36. A process as defined in claim 128 wherein the water vapor partial pressure in step (2) is above about 4.0 p.s.i.a.

37. A process as defined in claim 21 wherein said catalysts in steps (1) and (2) comprise the same or different carrier material selected from the group consisting of (1) alumina and (2) silica-alumina containing between about 20 and 30 weight percent alumina.

38. A process as defined in claim 1, 4, 5, 8, 9 or 10 wherein the conversion to elemental sulfur in step (1) is at least 68.7 percent.

39. A process as defined in claim 1, 2, 3, 6, 7 or 10 wherein said conversion to elemental sulfur in step (1) is at least 77.0 percent.

40. A process as defined in claim 21 wherein said conversion to elemental sulfur in step (1) is at least 68.7 percent.

41. A process as defined in claim 34 wherein said conversion to elemental sulfur in step (1) is at least 77.0 percent.

42. A process as defined in claim 35 wherein said conversion to elemental sulfur in step (1) is at least 68.7 percent.

* * * * *

UNITED STATES PATENT AND TRADEMARK OFFICE
CERTIFICATE OF CORRECTION

PATENT NO. : 4,444,741

DATED : April 24, 1984

INVENTOR(S) : ROBERT H. HASS and JOHN W. WARD

It is certified that error appears in the above-identified patent and that said Letters Patent are hereby corrected as shown below:

In column 18, line 18, delete "vol.%".

In column 20, line 36, delete "128" and insert -- 35 --.

Signed and Sealed this

Eighteenth Day of September 1984

[SEAL]

Attest:

GERALD J. MOSSINGHOFF

Attesting Officer

Commissioner of Patents and Trademarks